US010066786B1

(12) United States Patent
Cox

(10) Patent No.: US 10,066,786 B1
(45) Date of Patent: Sep. 4, 2018

(54) CAMERA MOUNT

(71) Applicant: ACAM Invest Ltd., Pembrokeshire (GB)

(72) Inventor: Adrian Cox, Pembrokeshire (GB)

(\*) Notice: Subject to any disclaimer, the term of this patent is extended or adjusted under 35 U.S.C. 154(b) by 0 days.

(21) Appl. No.: 15/581,373

(22) Filed: Apr. 28, 2017

(51) Int. Cl.
| | |
|---|---|
| *G03B 17/56* | (2006.01) |
| *F16M 13/04* | (2006.01) |
| *F16M 11/28* | (2006.01) |
| *F16M 11/04* | (2006.01) |
| *F16M 11/16* | (2006.01) |
| *F16M 11/42* | (2006.01) |
| *F16M 11/20* | (2006.01) |
| *F16B 7/14* | (2006.01) |
| *F16B 7/04* | (2006.01) |
| *F16F 15/28* | (2006.01) |
| *F16M 11/18* | (2006.01) |
| *F16M 11/10* | (2006.01) |
| *F16M 11/12* | (2006.01) |

(52) U.S. Cl.
CPC ............ *F16M 13/04* (2013.01); *F16B 7/042* (2013.01); *F16B 7/14* (2013.01); *F16F 15/28* (2013.01); *F16M 11/041* (2013.01); *F16M 11/16* (2013.01); *F16M 11/2035* (2013.01); *F16M 11/2085* (2013.01); *F16M 11/28* (2013.01); *F16M 11/42* (2013.01); *G03B 17/561* (2013.01); *G03B 17/566* (2013.01); *F16M 11/10* (2013.01); *F16M 11/12* (2013.01); *F16M 11/18* (2013.01); *G03B 17/56* (2013.01)

(58) Field of Classification Search
CPC ..................................... G03B 17/56
USPC ......................................... 396/428
See application file for complete search history.

(56) References Cited

U.S. PATENT DOCUMENTS

| | | | | |
|---|---|---|---|---|
| 6,994,436 | B2* | 2/2006 | Harris | F16M 13/04 352/243 |
| 7,448,812 | B2* | 11/2008 | Heibel | B60R 11/04 396/419 |
| 8,014,656 | B2* | 9/2011 | Woodman | B63B 25/002 396/25 |
| 2005/0061933 | A1* | 3/2005 | Barth | F16M 13/04 248/178.1 |
| 2007/0053680 | A1* | 3/2007 | Fromm | F16M 11/14 396/420 |

(Continued)

FOREIGN PATENT DOCUMENTS

| | | | | |
|---|---|---|---|---|
| CN | 203376551 | * | 1/2014 | ............ F16M 11/12 |
| GB | 2532260 | | 5/2016 | |

OTHER PUBLICATIONS

Combined Search and Examination Report under Sections 17 & 18(3) dated Jan. 25, 2017 in United Kingdom Patent Application No. 1420206.3.

*Primary Examiner* — Clayton E Laballe
*Assistant Examiner* — Kevin Butler

(57) ABSTRACT

A camera mount (1) for a camera, comprising: a base mounting means configured to securely connect to a base; a camera platform (3) configured for mounting a camera securely thereon, and; an extension element (4) configured to extend between the base mounting means (2) and the camera platform (3) so that in use a camera mounted on the camera platform (3) is held a distance away from the base mounting means (2).

The camera mount includes a sacrificial point to permit detachment of the camera platform (3) from the base mounting means when a force is applied.

21 Claims, 14 Drawing Sheets

(56) References Cited

U.S. PATENT DOCUMENTS

| | | | |
|---|---|---|---|
| 2007/0160364 A1* | 7/2007 | Peika | F16M 11/14 396/428 |
| 2009/0039213 A1* | 2/2009 | Darrow | B60R 11/02 248/163.1 |
| 2010/0155549 A1* | 6/2010 | Robinson | F16M 11/10 248/183.1 |
| 2016/0187763 A1* | 6/2016 | Fromm | G03B 17/561 396/428 |
| 2016/0191755 A1* | 6/2016 | Fromm | H04N 5/2252 348/373 |

* cited by examiner

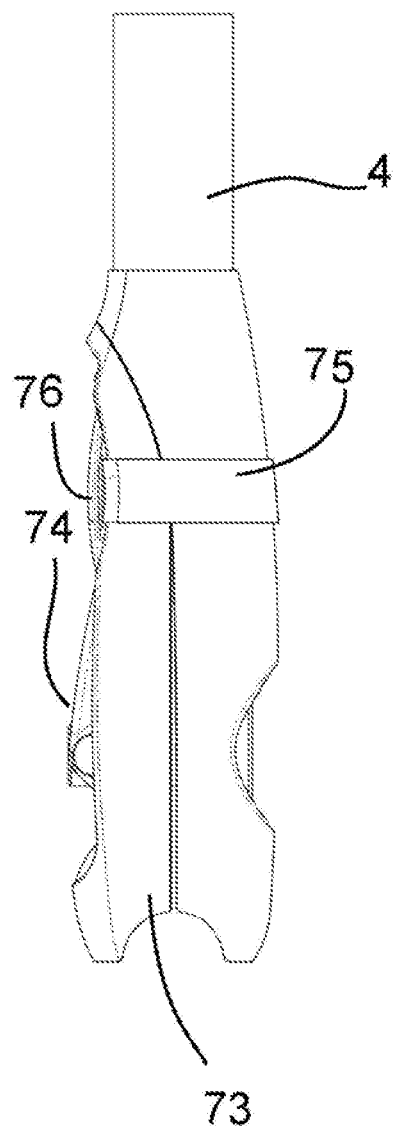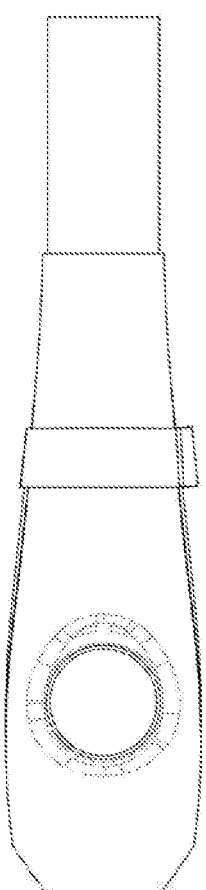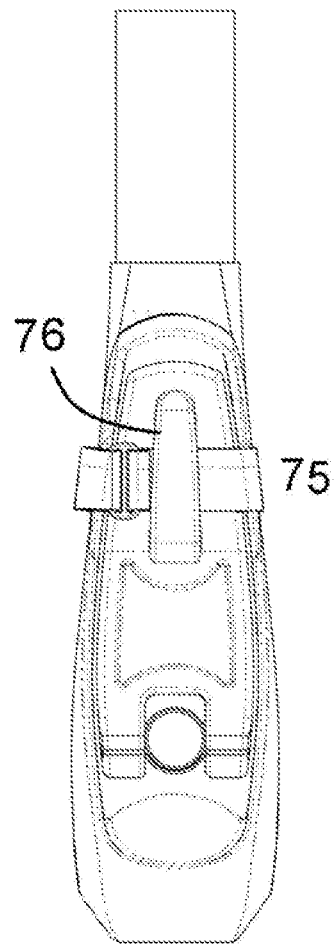
FIG. 4a
FIG. 4b
FIG. 4c

CAMERA MOUNT

FIELD OF THE INVENTION

The present invention relates to a camera mount for mounting a camera to a person, animal, object or an item. More particularly the camera mount is a so-called hands-free camera mount and includes a detachment mechanism that is activated upon application of force or impact so as to separate the camera from a portion connecting the camera to the camera mount.

BACKGROUND

Recent advances in camera technology have made digital cameras cheaper, increasingly more readily available, robust and lightweight. It has become increasingly popular for sports people to mount lightweight, robust cameras, such as those sold under the trade name GoPro®, on to themselves or items of equipment in order to record their activities.

These lightweight and robust cameras are easily mountable to a helmet or similar head gear, and allow skydivers, cyclists, motorcyclists, kayakers to record so called point of view (POV) or near-POV footage.

However, it is more difficult for individuals to film themselves at a distance and generally a team is required as well as additional equipment in order to do this. For example, if a mountain bicycler wishes to record their descent of a trail, they can either mount the camera to their bicycle or themselves, aligning the camera so that it records surroundings as they pass from or towards the rider's POV. Alternatively a camera can be mounted to point at the user so as to exclude a great deal, if not all, of passing contextual surroundings from the footage. Alternatively, a user can mount a camera to a partner or a friend's bicycle, and cycle in front of them so that footage of one rider is captured from a distance by another; the distance between the riders allowing the camera to capture both the rider and contextual surroundings.

When the camera is fixed in position there is a risk of injury to a user (wearer or rider), as well as a risk of damage to the camera, for example if there is a collision or impact.

The present invention provides a camera mount suitable for multiple uses, including filming at a distance, and includes a safety mechanism to separate parts of the camera mount when a predetermined amount of force is exceeded.

PRIOR ART

International Patent Application WO2013007409 (Steinhauser) describes and shows a system for attaching a camera to a user. The system comprises a baseplate, a holding rod attached to the baseplate, and an attachment device attached to the holding rod. The attachment device is designed in such a way that the camera can be attached thereto. The baseplate is designed in such a way that it can be attached to a back device that can be attached to the user's back.

US Patent Application US20080187308 (Hannan) describes a video device that is hand-held and therefore follows the user, keeping the user in view as he or she moves. The device consists of an extendable pole with a camera platform on one end and a remote control on the hand held other end. A camera mount is angled so that the pole and a user's hand are just outside the camera's field of view. The user is able to film his or her self with a camera that is several feet away. This gives the impression that there is another person operating the moving camera.

International Patent Application WO9427084 (Meriaux-Delbarre) describes and shows camera equipment for motion picture and/or video recording. The camera is disposed at the end of a boom which can be held by an operator.

Chinese Utility Model CN203376551U (Zhang) discloses a multifunctional videography/cinematography balancing support comprising a triangular supporting assembly.

US Patent Application US2005/0061933 (Barth) discloses a portable stand for holding and supporting video cameras.

US Patent Application US2007/0053680 (Fromm) discloses a camera support assembly including an elongated support.

US Patent Application US2010/015549 (Robinson) discloses a portable, segmented support system used to elevate a camera for recording or photographing action in the area above volleyball net.

The present invention seeks to overcome various drawbacks associated with prior art devices.

SUMMARY OF THE INVENTION

According to a first aspect of the present invention there is provided a hands-free camera mount comprising: a base mounting means configured to securely connect to a base; a camera connector configured for mounting a camera securely thereon; an extension element configured to extend between the base mounting means and the camera connector so that in use a camera is mounted on the camera connector at a distal end of the extension element so that the camera is held a distance away from the base mounting means that is attached to a user or a surface; wherein the base mounting means includes a ball mounting mechanism to allow the extension element to be adjusted to a user selectable angle; and wherein a sacrificial point is provided at the base mounting means to permit detachment of the camera connector and extension element if subjected to impact from a predetermined force.

It is appreciated that the camera may include an imager suitable for capturing images other than photographs or film. For example the imager may be a thermal imager to detect heat signatures to determine which muscle groups on a user are working hardest, or to determine performance of clothing by analysing heat signatures. Alternatively the imager may include an array of charge coupled devices (CCDs).

In preferred embodiments the at least one sacrificial point is incorporated in the camera mount.

There may be further sacrificial points, fracture of any of which serves to detach camera mount parts one from another and/or to detach the camera connector and extension element from the base mounting means, in response to impact or force. For example if the user falls or has a collision, the camera connector detaches with the camera so preventing injury to the user.

The detachment mechanism permits the camera connector and extension element, and thereby the camera, to detach from the base mounting means upon application of a predetermined force. In this way the user is less likely to be injured if they come into contact with the camera mount and the camera is less likely to be damaged when hitting any object.

It is appreciated that various detachment mechanisms may be used to permit detachment of the parts under force. Advantageously the sacrificial point also enables reattachment so that the parts can be reconnected after detachment.

The sacrificial point of the detachment mechanism may include, but is not limited to, the following items: a sprung mechanism, a detent mechanism, an interlocking assembly and a ball and socket arrangement.

In some embodiments it may be possible to alter the level of force at which detachment occurs. For example the amount of predetermined force may be varied in order to correspond to the activity or a user's weight. For example a spring tension may be altered to enable the sacrificial point to be activated upon application of a greater force or a lesser force.

In some embodiments the camera mount may include a safety line to keep the camera connector and base mounting means connected one to another when the parts have been separated at the sacrificial point so as to prevent loss of the camera.

In preferred embodiments the extension element comprises at least one locking mechanism. Such mechanism may be intermediate the element, wherein for example the element comprises a plurality of coaxial poles.

The present invention provides a simple, robust system that offers the combination of a lightweight system for securely mounting a camera to a person, animal, object or apparatus, where the camera is also held at a distance from the person or apparatus to which it is mounted so that photographs or footage taken by the camera provide contextual distance, leaving the user's hands free from operating/holding the camera, and where the equipment also allows the user to focus on the activity rather than the camera.

It is appreciated that the hands-free camera mount may be arranged on a person, such as about a user's waist, on a helmet, wrist band or shoe. The camera mount may be arranged on an animal, for example about an animal's neck or girth, on a collar, a bridle or saddle.

The hands free camera mount may be mounted on an object or such as a vehicle, bicycle, motorcycle, kayak, boat, surfboard, or on part of an apparatus such as on a boom, mast, handlebar, waterski/wakeboard line, climbing rope or backpack. The preceding lists serve as examples only and use is not limited to only these examples.

According to a second aspect of the present invention the camera connector comprises a camera platform that accommodates a self-levelling mechanism for obtaining a horizontal horizon for the camera in use.

Accordingly in some embodiments the camera platform or camera connector comprises a joint with a self-levelling mechanism. The self-levelling mechanism may comprise a counterweight extending a distance below the camera platform or platform. The distance may be adjustable and/or settable by way of a lock means. Ideally all moveable connections between the camera and user are adjustable and/or settable.

Mounting the camera a distance away from the base mounting means allows the camera to be used to take pictures of a user from a distance so that their surroundings are included in the picture to give context, and making the mount lightweight allows the mount to be used by an individual during sports activities or similar without the mount or the camera interfering with the activities. It may be envisaged that a plurality of known mounting means may be used to enable the extension element to attach to many different objects or parts of a person.

Advantageously, the extension element may be sized so that the camera platform can be held a distance of substantially up to 150 cm away from the base mounting means. This allows the user and sufficient of the user's surroundings to be photographed or filmed to provide context, without the mount becoming unwieldy.

In some embodiments the extension element may be a short portion that provides minimal separation between the base mounting means and the camera connector, whilst still permitting full range of movement of the camera.

For example the extension element may be less than 5 cm and in some embodiments less than 1 cm, so as to be spaced apart sufficiently to permit uninterrupted movement of the camera connector that is holding the camera, without being significantly extended from the surface to which the camera mount is connected.

For example if the camera mount is arranged on a sail mast or boom there may be no requirement for the camera to be significantly extended from the base mounting means as the location on the boom or mast provides a suitable vantage point.

The mount may additionally provide joints allowing the user to arrange the distance and attitude of the camera and in relevant embodiments the self-levelling mechanism at all times ensures that the camera provides a level horizon.

In preferred embodiments the extension element is configured so as to extend the camera platform or camera connector from the base mounting means in more than one plane of extension, in a manner configured in use or before use. For example in some embodiments the extension element may include or comprise a gooseneck or multiply articulated length arranged or arrangeable to distance the camera from the user.

In a preferred embodiment the extension element may be fixed or set so as to maintain the camera's attitude with respect to the user and the range, confines or boundaries of the self-levelling mechanism may be set at the joints.

A ball mounting mechanism located at the base of the camera mount allows the pole to be adjusted at any angle through a hemi-sphere (or slightly beyond) thereby providing huge flexibility in the chosen perspective of the camera, wherein the extension element adds to this flexibility.

Advantageously, the extension element may comprise a main section and an angled section, the main and angled sections are ideally arranged with their long axes at an angle one to another. The angled section is ideally dimensioned and arranged so that the camera platform is held away from the long axis of the main section. This allows the camera to be mounted so it is looking slightly downwards on a user, which helps to provide contextual background, and reduces the visibility of the extension element in the camera's viewing frame so as to make the extension element less conspicuous in filming material.

Advantageously, at least the main section comprises a telescopic member such as a pole. The telescopic member allows the distance from the mount to the camera to be adjusted easily, and enables the mount to be provided in a compact form for storage or transport when not in use.

The main section may be provided in segments. Each segment of the main section may be completely removed from other segment parts so as to allow each segment to be stored adjacent one another (side by side) with a maximum segment length not exceeding 53 cm for example. This enables the device to be stored within a small rucksack or a 'cabin luggage' type suitcase.

Advantageously, the telescoping pole may be extendible substantially up to 150 cm. This allows the user and enough of their surroundings to be photographed or filmed to provide context, without the mount becoming unwieldy.

Advantageously, the telescoping pole comprises a plurality of coaxial segments or sections, locking means associated with each pair of adjacent segments, the locking means is configurable to lock adjacent segments in relative positions thereby enabling a user to choose a preferred position both rotationally and longitudinally. This arrangement provides a robust mechanism that allows a wide range of adjustment while also allowing smaller or more minor adjustments to be made easily and quickly. Extra sections may be inserted or removed in use so as to extend or shorten the extension element.

In some embodiments the locking means may be a twist lock or twist locks. This is a simple and robust mechanism.

In preferred embodiments the locking means is a clamp lock mechanism thereby allowing fine rotational adjustments.

Advantageously, the camera platform may be self-levelling and may comprise a damping counter-weight which helps to steady the platform.

Advantageously, the damping counterweight may be configured to extend below a camera mounted on the camera platform. This helps to steady the camera platform. Advantageously, the damping counterweight may comprise an elongate extension and a weight, the elongate extension may connect between the camera platform and the weight so that the weight is held at a distance from the camera platform.

Advantageously, the base mounting means includes a base plate which may comprise one of the ball or socket portions of a ball and socket joint. The adjacent end of the extension element may comprise another portion of the ball and socket joint. The ball and a lockable socket may be rotatable in a socket support or housing. This in turn allows the platform to alter in positioning with respect to the base plate.

Typically the base mounting means is adapted for attachment to a user or to a surface. For example in some embodiments the first face may be a plate that can be connected to, or about a surface or an item, for example to a belt.

In other embodiments a first face may include a securing means such as a hook, clasp, buckle, D-ring, suction pad, jubilee clip or similar connector so as to permit a first face of the base mounting means to be connected to the user or surface. A second face may include the ball or socket arrangement or other connector to connect to the extension element.

The securing means is adjustable so as to accommodate different people, animals, objects and apparatus. In this manner the base mounting means can be readily attached to a user, object or apparatus. It is also appreciated that the base mounting means may be interchangeable so as to be changed depending upon the activity.

Advantageously, the lightweight camera mount may further comprise a quick release mechanism configured to detach the extension element from the base mounting means when activated. This allows a user to quickly disengage from the extension element and camera platform in an emergency. This also allows the extension element to be used as a hand held camera mount only, whereby the base end of the extension element with the quick release handle closed, forms a comfortable handle. Advantageously, the quick release mechanism may comprise a lever. This is a simple and easily operated mechanism.

Advantageously, the base mounting means may be configured for rigid connection to a base that forms part of a body harness. This allows a user to wear the camera mount in use, leaving both hands free and ensures the camera is held at a fixed orientation. Alternative embodiments may be configured for rigid connection to a variety of bases, so as to allow attachment to many different items or surfaces, such as bars, rails, surfaces, for example and without limitation, which have practical use in filming or photographing for example and without limitation, cycling, surfing, windsurfing, driving.

The camera platform/camera connector in some embodiments can be removed and changed for alternative camera platforms, such as comprising a quarter inch male thread to accommodate cameras with conventional tripod mounting. This can also be changed for alternative platforms or so as to accommodate other devices, such as, but not limited to, mobile telephones, or torches.

BRIEF DESCRIPTION OF FIGURES

FIGS. 4a to 4c show side views of the intermediate extension locking mechanisms as shown in FIGS. 1a and 1b;

FIGS. 6a to 6c show side views of the camera mount as shown in FIG. 1a;

FIG. 8b shows a side view of the camera mount of FIG. 8a;

DETAILED DESCRIPTION OF FIGURES

Embodiments of the camera mount of the present invention will now be described with reference to the Figures.

Figures 1A, 1B:
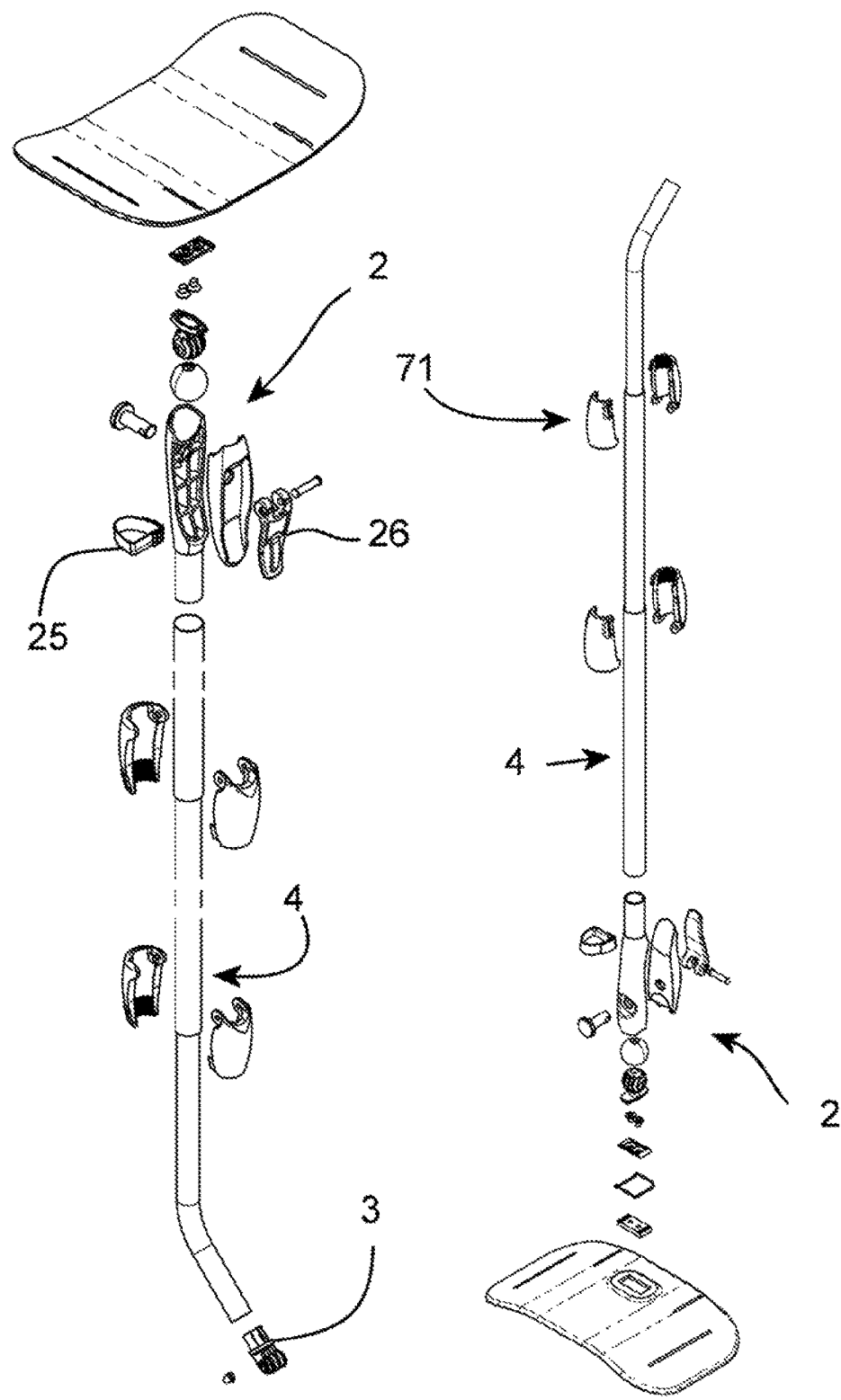
FIG. 1a shows an exploded isometric view of a first embodiment of the camera mount according to the present invention with camera platform attachment.
FIG. 1b shows a reverse exploded isometric view of a first embodiment of the camera mount according to the present invention.
Figure 2A:
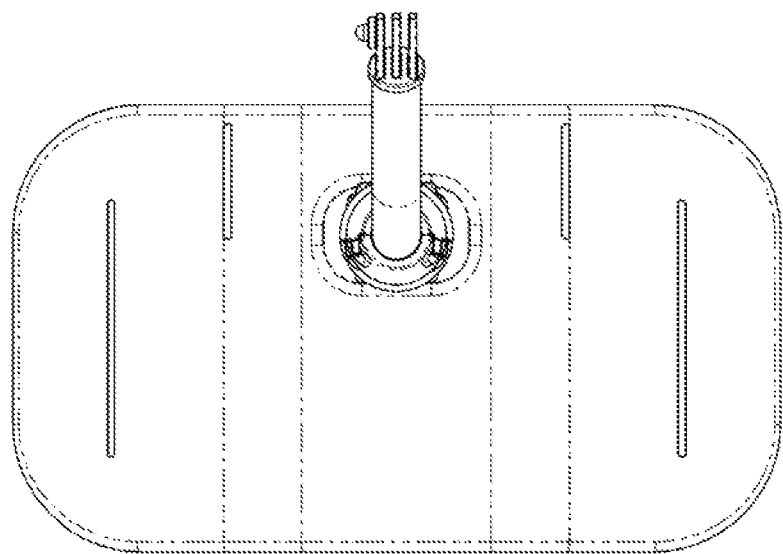
FIGS. 2a and 2b show a base mount of the first embodiment as shown in FIGS. 1a and 1b in plan view.
Figure 2B:
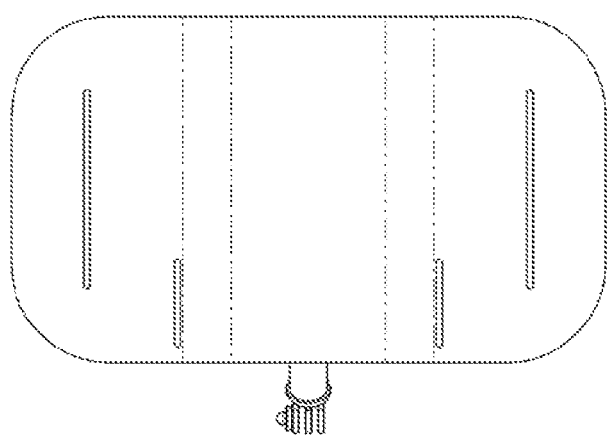
Figure 3A:
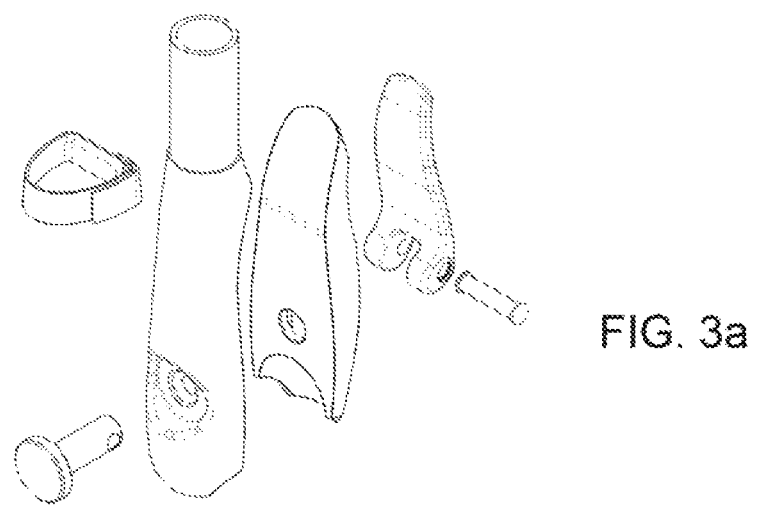
FIGS. 3a and 3b show isometric exploded views of an intermediate extension locking mechanisms as shown in FIGS. 1a and 1b.
Figure 3B:
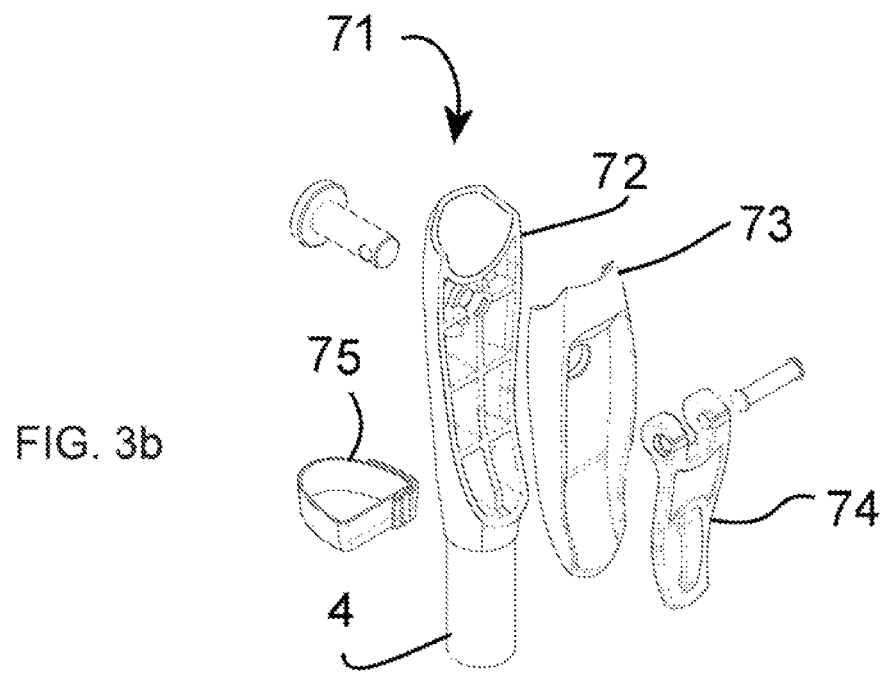
Figures 5A, 5B:
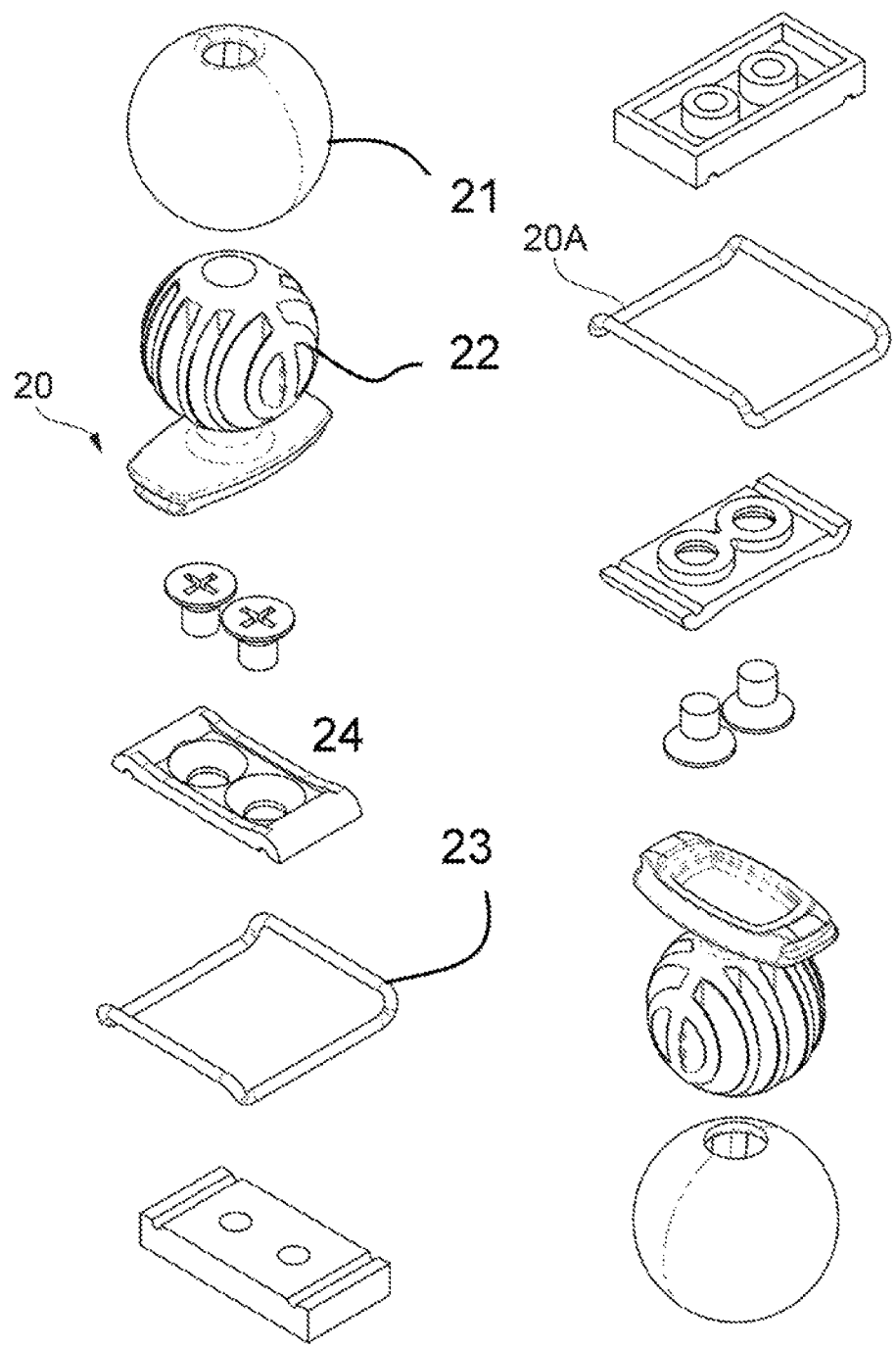
FIGS. 5a and 5b show exploded isometric views of the ball joint as shown in FIGS. 1a and 1b.
Figure 6A:
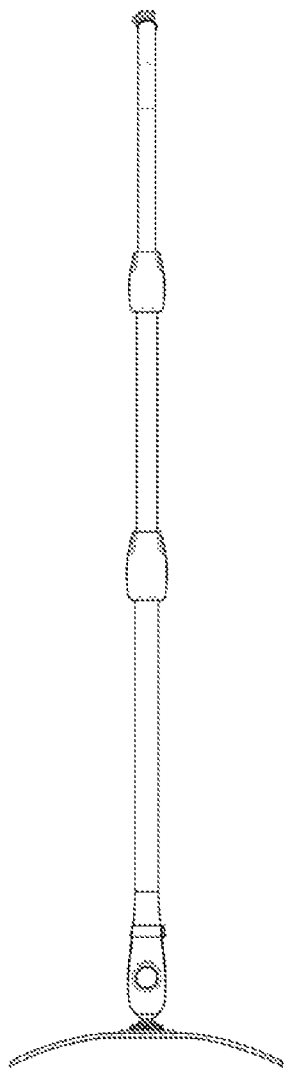
Figure 6B:
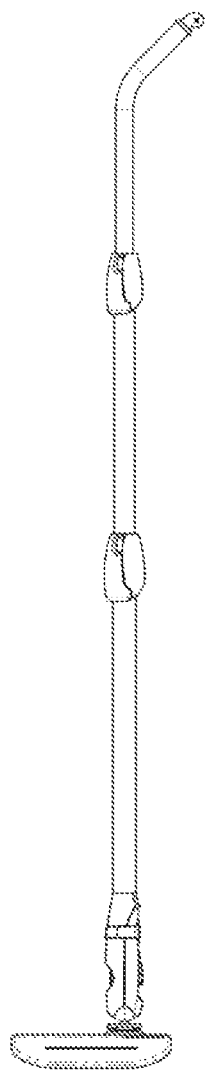
Figure 6C:
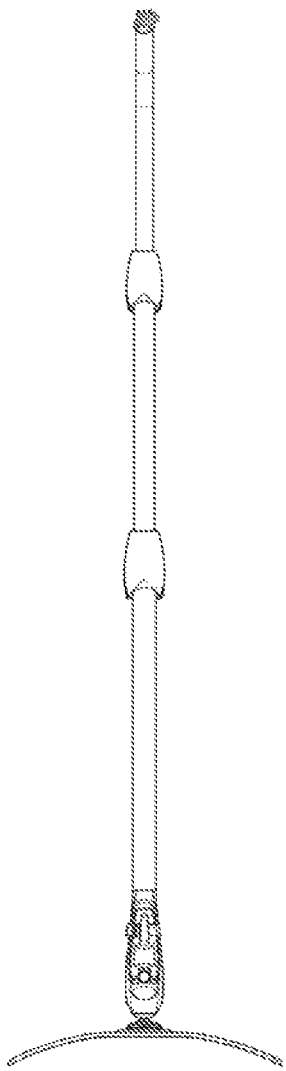
Figure 7A:
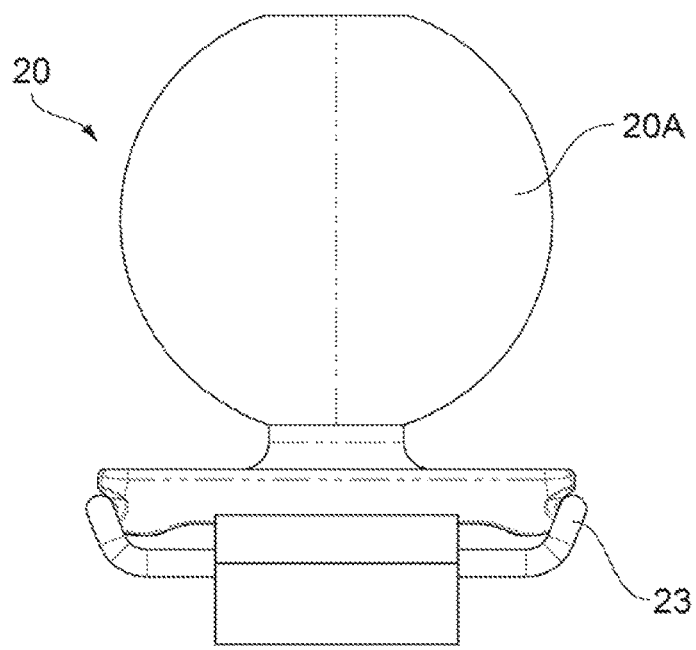
FIGS. 7a and 7b show side views of the sacrificial point and ball joint as shown in FIGS. 5a and 5b.
Figure 7B:
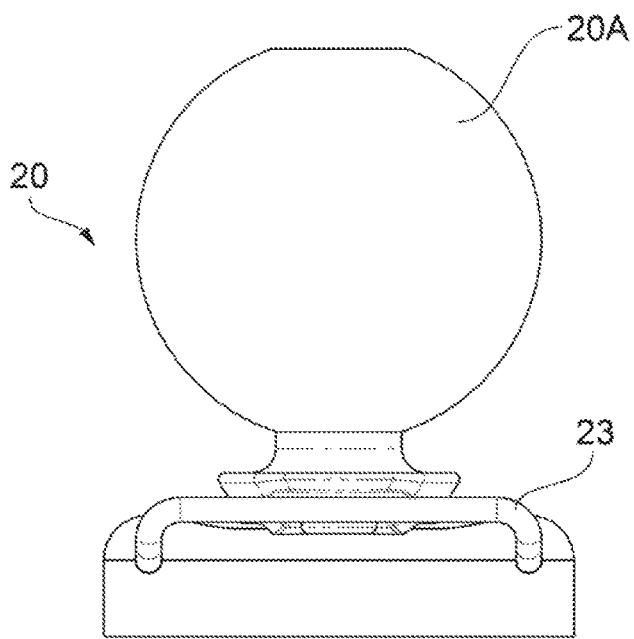
Figure 8A:
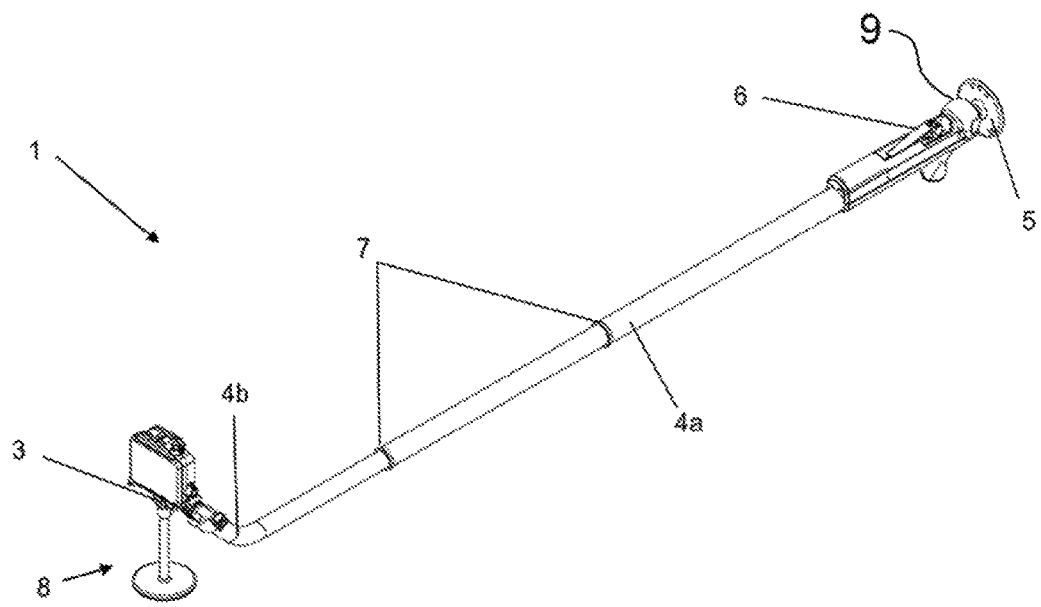
FIG. 8a shows a perspective view of a second embodiment of the camera mount.
Figure 8B:
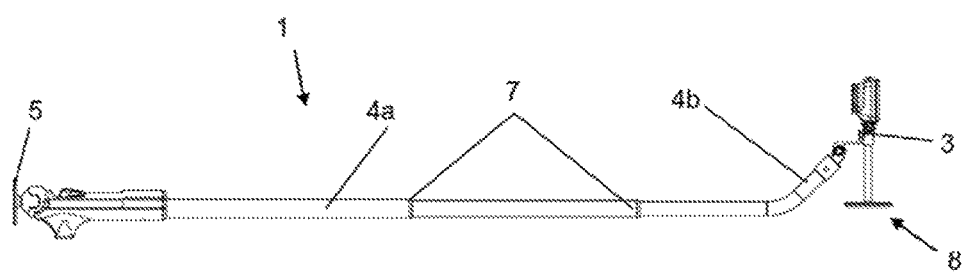

FIGS. 1a to 7b disclose a first embodiment of the camera mount. FIGS. 8a and 8b disclose a second embodiment with a self-levelling mechanism. FIG. 8a shows a perspective view of a second embodiment of the camera mount with a base mount, a telescoping extension element connected to the base mount via a lockable ball and socket joint, the extension element releasable from the base mount via a quick-release mechanism operated by a lever, a camera platform mounted on the outer or far end of the extension element with a camera mounted thereon; the camera mount having a damping counterweight.

Figure 9A:
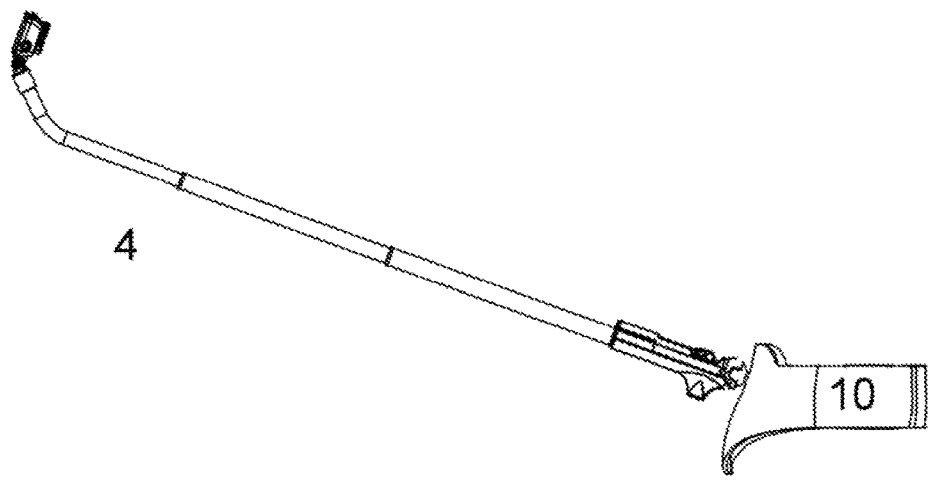
FIG. 9a and FIG. 9b show a side view of a third embodiment of the camera mount without a self-levelling mechanism, attached to a harness, and an isometric view of the camera mount.
Figure 9B:
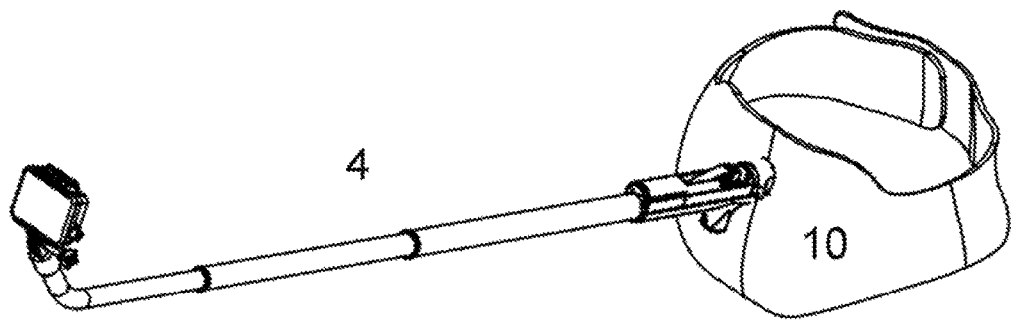
Figures 10A, 10B:
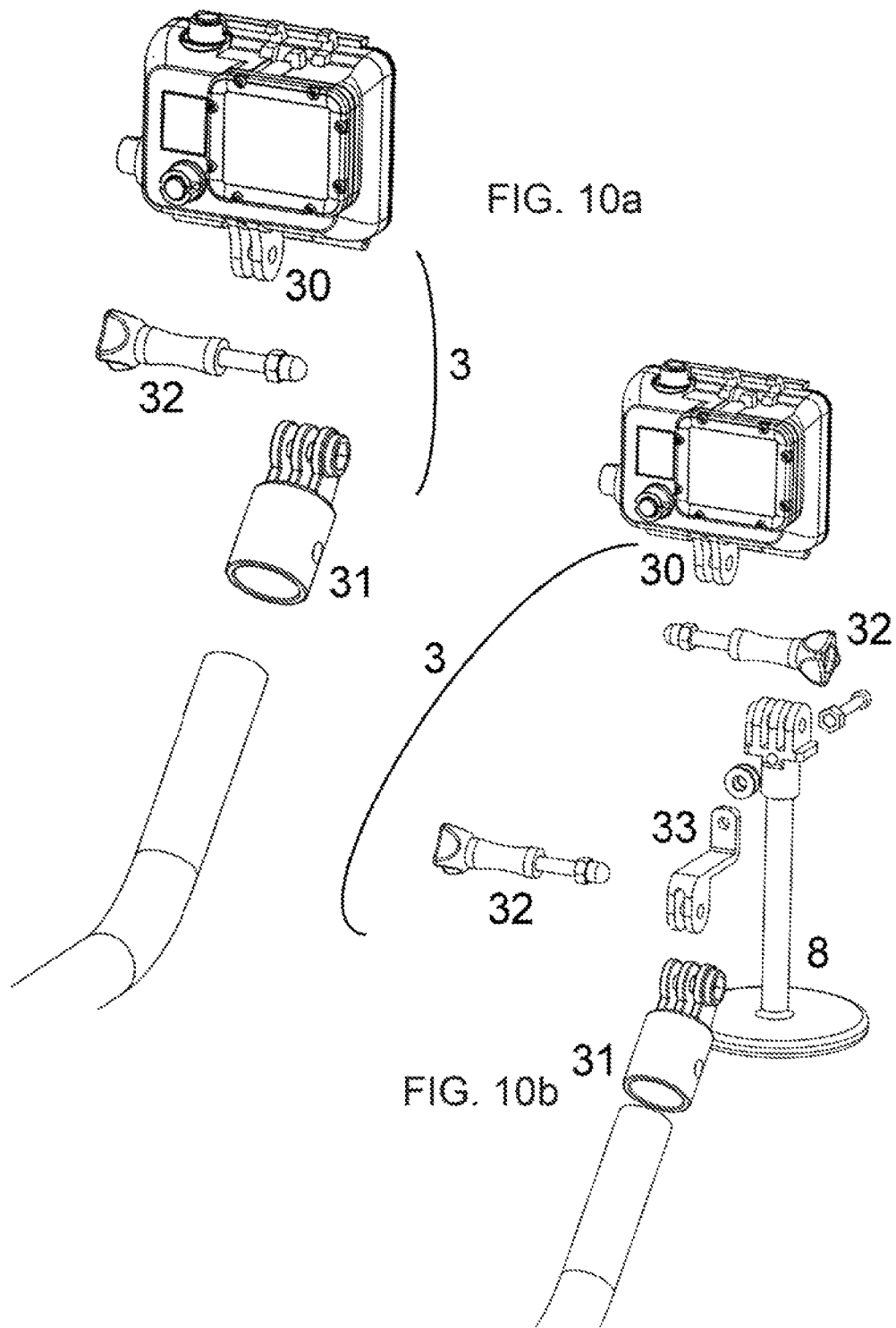
FIGS. 10a and 10b show exploded isometric views of the embodiments shown previously in FIGS. 8a, 8b, 9a and 9b, with and without self-levelling mechanism respectively.
Figure 11A:
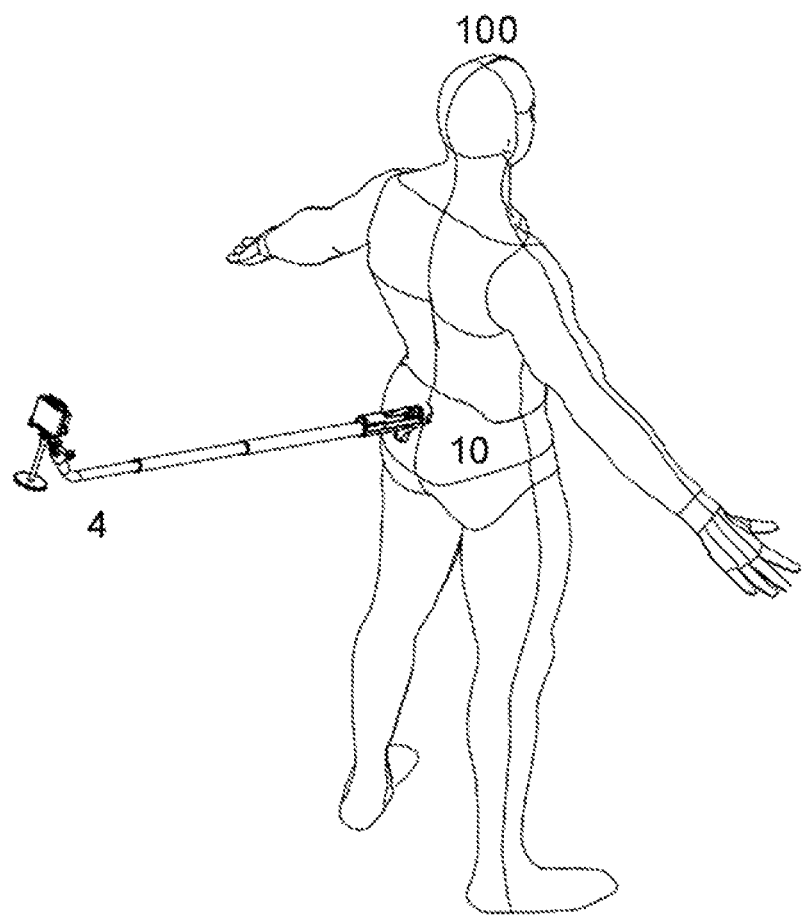
FIG. 11a shows an isometric view of the embodiment shown in FIGS. 1a and 1b secured via a harness to a user.
Figure 11B:
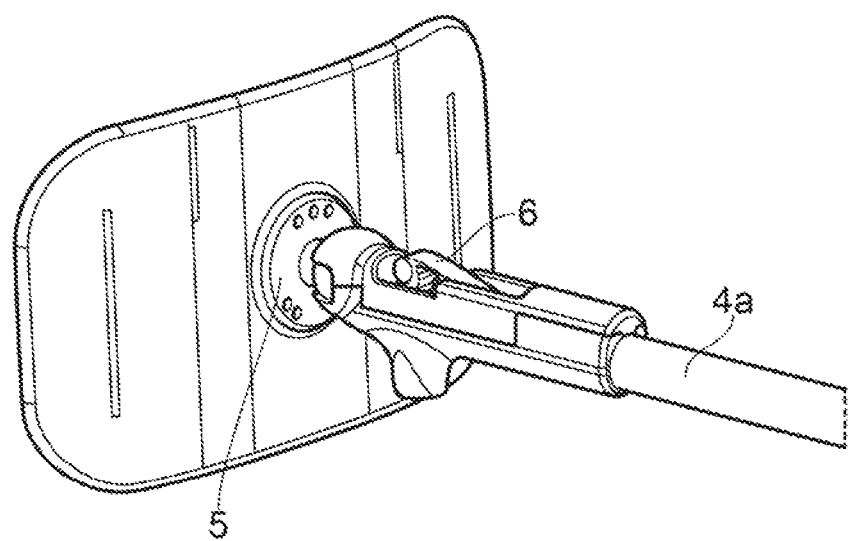
FIG. 11b shows a sketch of a close up detail view of the inner or user end of the extension element, connected to a base that forms part of a body harness.
Figure 12A:
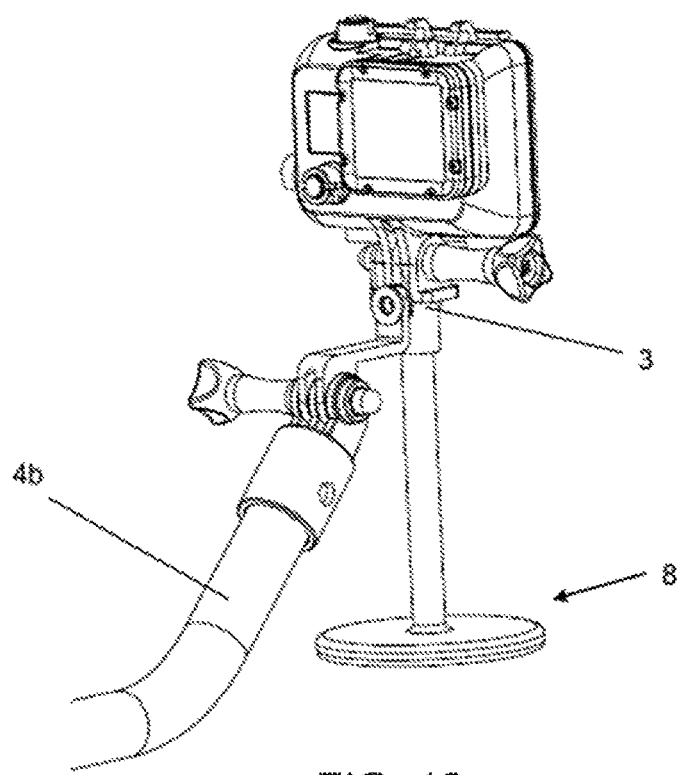
FIGS. 12a and 12b show an isometric detail view of the second embodiment of the camera mount of the present invention.
Figure 12B:
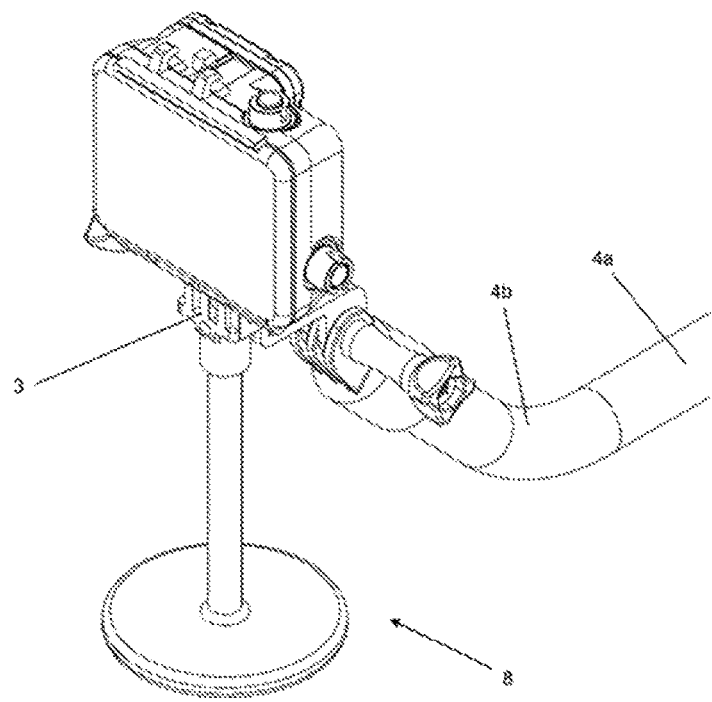

FIGS. 9a and 9b show the camera mount shown in FIGS. 8a and 8b without a self-levelling mechanism; FIGS. 9a and 9b and FIG. 11a show an embodiment of a fabric, cloth or material harness 10 for final mounting to a user 100.

The camera mount 1 of all embodiments have three main elements: a base mounting means 2, a camera platform 3 and an extension element 4. These elements and their inter-relationship are described in detail below wherein like parts bear the same reference numerals.

The base mounting means 2 of the second embodiment comprises a socket and the ball portion of a ball and socket joint, the ball portion formed as a unitary item with a ball connected to a small attachment plate 5 by a short stalk.

Figure 13A:
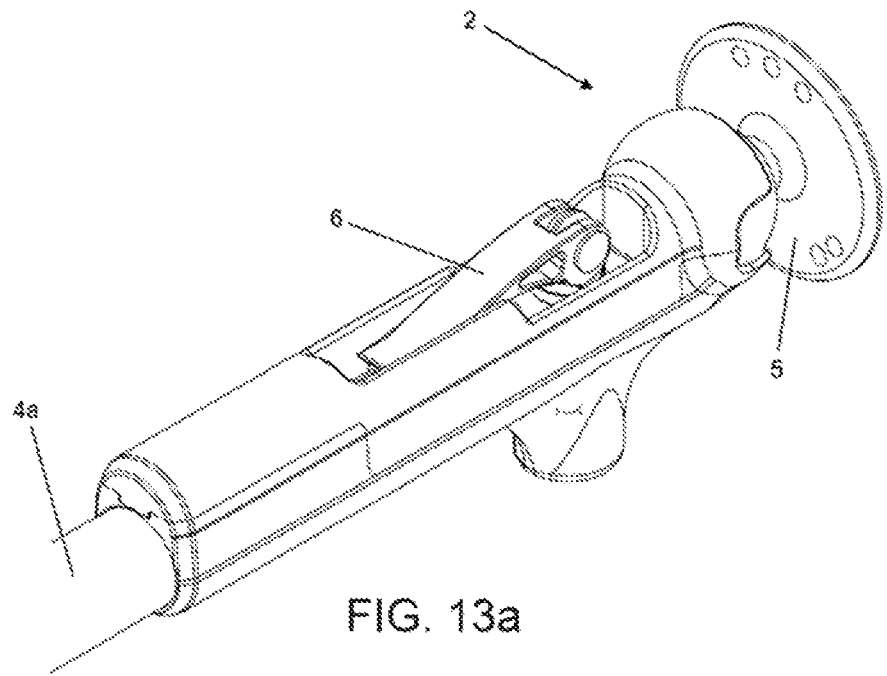
FIG. 13a shows a close up detail view of the inner or user end of the extension element, showing detail of the ball and socket joint and the quick release lever.
Figure 13B:
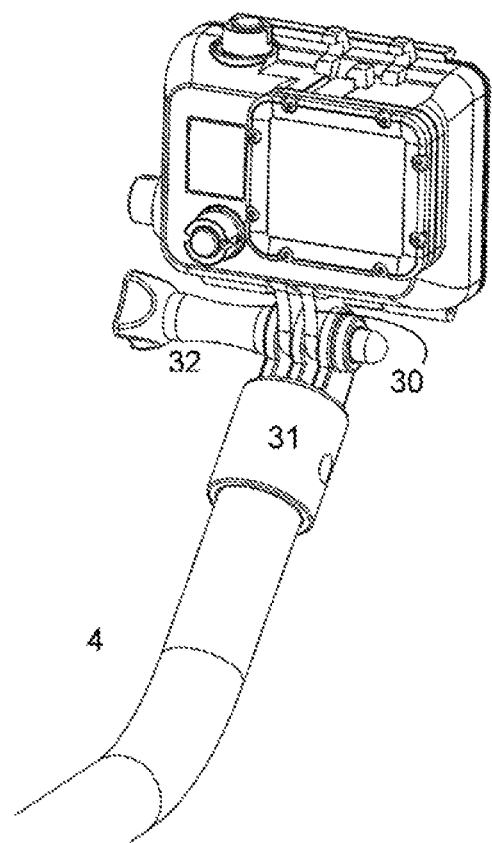
FIG. 13b shows a close up of the outer end of the camera platform of the third embodiment.

In FIG. 13a, the attachment plate 5 has a number of apertures spaced around the rim that allow the ball portion to be connected via screws or similar to a base plate or a similar mount. In this embodiment and as shown in FIGS. 9a and 9b, the base mounting means is rigidly mounted to a base plate that forms part of a body harness.

Figure 14A:
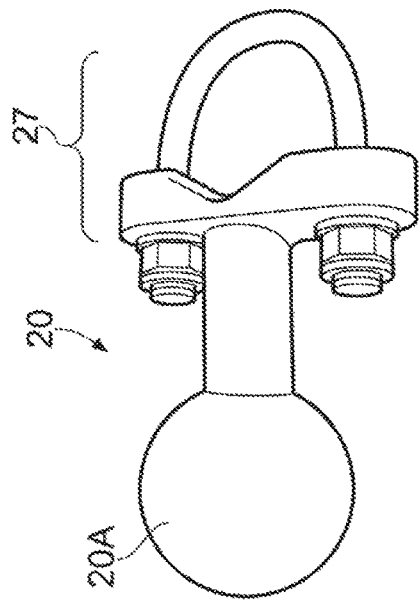
FIGS. 14A to 14D show further examples of a ball with different connectors.
Figure 14B:
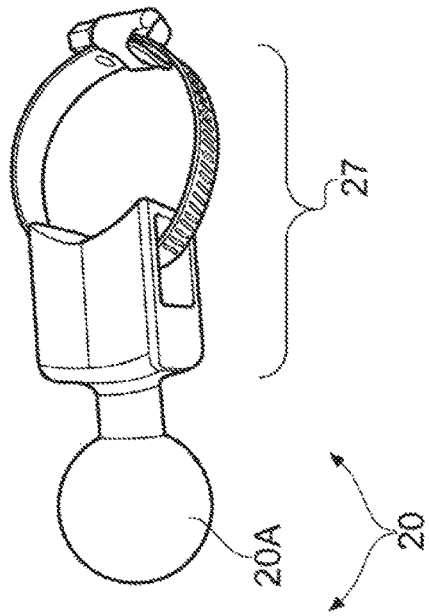

In other embodiments the ball may be connected to a bar clamp, gripping jaws, or other means that attach to apparatus or independent objects. Various embodiments of the ball 20 are shown in FIGS. 14a to 14b. Each ball 20 is shown with a different securing means 27.

FIG. 14A shows a ball 20a with a member 27 for mounting on a belt for securing around the waist of a user.

FIG. 14B shows a ball 20a with a D-ring 27 for securing about an object such as a bar or rail, for example a handlebar.

Figure 14C:
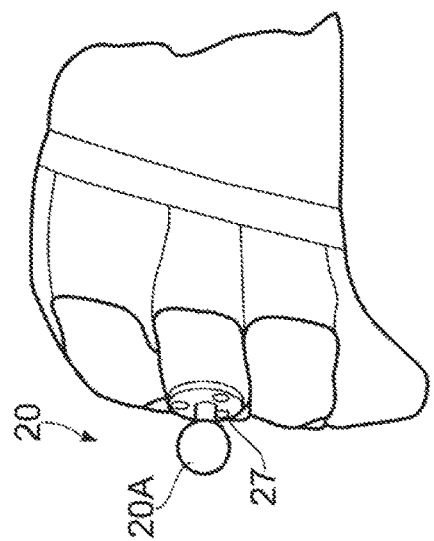

FIG. 14C shows a ball 20a mounted in a plate having two suction pads 27 for attaching to a surface.

Figure 14D:
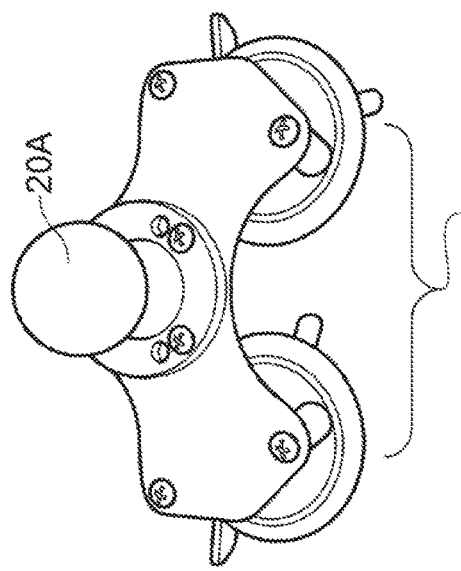

FIG. 14D shows a ball 20a with a jubilee clip 27 for securing about an object such as bar or rail, for example a boom or mast. Each ball mount 20 may include a breakaway mechanism (not shown in FIGS. 14A to 14B).

Alternatively the socket that receives the ball 20A may be adapted to provide the breakaway means, so as to permit the ball and socket to separate when a predetermined force is applied. In this way the socket permits both a range of movements and a means of detachment.

With reference to the first embodiment the extension element 4 comprises telescopic coaxial poles, having intermediate locking mechanisms 71 to lock the poles when extended or retracted. The mechanism comprises a resiliently deformable cam clip mechanism, wherein a lever 74 hingedly mounted on an outer pole 4 is pushed down to deform the clip against the subsequent inner pole. A Velcro® strap dead man's loop 75 holds the cam lever closed, squeezing clamp parts, wherein one part 72 is bonded to the wider pole, and the other clamp part 73 is deformed and teethed to grip smaller pole with an interference fit. The loop is placed in use under a clip 76.

A sacrificial point is included at the base mounting means 2, with reference to the extension element 4, wherein under impact or adverse forces the camera platform 3 and extension element 4 detach from the base mounting means. In some embodiments a leash means may be included (not shown) so as to ensure that the camera is not lost in use. The leash may be elastic.

In the first embodiment a ball mount replaces a proprietary Ram® wall mount used in the second embodiment. The ball mount 20 comprises a rubber overmould 21 and plastic interior 22.

The ball mount 20 also has comprises a breakaway failsafe, comprising a sprung wire connection 23 to base of ball which spring allows the ball's mounting 24 to escape the spring under sufficient pressure.

The socket is formed as per the second embodiment and is clamped shut using a cam lever. The socket further includes a Velcro® strap dead man's loop 26 to hold the cam lever closed, thereby squeezing clamp parts over rubber ball.

The extension element 4 (FIGS. 4a and 4b) has an inner end 9 that forms the socket for the ball and socket joint. A lever 6 is located just behind the socket. The lever can be moved between an engaged position where the socket locks onto the ball and prevent relative movement of the two, and a disengaged position where the socket and ball can be moved relative to one another. In the disengaged position, the socket can also be easily moved off the ball, so that the extension element 4 and anything attached to it can be quickly and easily disconnected, for example if they need to be dumped in a hurry in an emergency. The lever 6 can also lock the socket onto the ball by folding down outside the inner end of the extension element, thereby allowing the lever to be operated easily whilst wearing thick gloves. The main body of the extension element extends behind the socket.

The extension element 4 comprises a main section 4a that extends from the socket, and an angled section 4b at the outer end, away from a user. In other embodiments the angled section may not be present or may be articulated and/or settable in angle before or during use. The angled section is so that the camera platform is held away from the long axis of the main section, and additionally or alternatively provides space below the camera platform at a majority of self-levelled camera orientations.

Each of these sections is formed as an elongate tubular section. The main and angled sections 4a and 4b are arranged with their long axes at an angle to one another, the angled section sized so that the camera platform is held a short distance (around 20-30 cm) away from the long axis of the main section 4a. This allows the camera to be mounted so it is looking slightly downwards on a user, which helps to provide contextual background and also reduces the visibility of the extension element in the camera frame so as to make the extension element less conspicuous in filming material due to the long axis of the main section 4a being a distance from the camera, rather than very close to the camera if the angled section (4b) did not exist.

The main section 4a is formed from a number of individual sections that telescoping within one another, and which can be locked in axial position via clamp locks between each section. In the preferred embodiment, there are three telescoping sections or segments that form the body of the main section 4a, the widest at the user or ball and socket end so the body tapers away from the user. Clamp locks 7 are located at the junctions where the sections meet. The main section can be extended up to 150 cm in length in this particular embodiment. For avoidance of doubt, different lengths may be envisaged, including an option for an intermediate poles to be interchangeable with an alternative pole (not shown) so as to increase maximum length.

A camera platform 3 is mounted at the far end of the extension element 4—that is, the outer end of the angled section 4b. Camera platform is at the end of 4b, shown in FIGS. 8a, 8b, 12a, 12b, 10b and 11a, with self levelling device mounted, but equally the camera could be mounted directly as in FIGS. 9a and 9b. This is a self-levelling camera platform, such as for example a commercially available Go Pro® mount. The camera platform 3 is modified by the inclusion of a damping counter-weight 8 comprising an elongate extension and a weight that extend below the camera platform 3. This helps to provide a steady filming platform.

The camera platform at the end of 4b is rotatable and lockable in any rotated position so as to add versatility to camera positioning. This can be removed and changed for alternative camera platforms, such as comprising a quarter inch male thread to accommodate cameras with conventional tripod mounting. This can also be changed for alternative platforms or so as to accommodate other devices, such as, but not limited to, mobile telephones, or torches. The camera platform 3 comprises a camera plate 30, pole bracket 31 and at least one screw barrel 32. The counter-weight 8 is inserted into the mechanism 3 at a cantilever brace 33.

In use, the camera mount 1 can be mounted where desired, for example to extend rearwardly and upwardly from a body harness worn by a user, so that the camera is approximately a meter or more behind a user and a little above them. When they are performing an activity such as kayaking, mountain biking, cycling or rock-climbing, and the camera takes footage of the user in the foreground and is also positioned sufficiently far enough from a user that the background is visible—that is, at least some of what a user is seeing (as well as the user). Mounting the camera a distance away from the base mounting means allows the camera to be used to take pictures of a user from a distance so that their surroundings are included in the picture to give context, and making the mount lightweight allows the mount to be used by an individual during sports activities or similar without the mount or the camera interfering with the activities.

The invention has been described by way of examples only and it will be appreciated that variation may be made to the above-mentioned embodiments without departing from the scope of invention as defined by the claims. Firstly it is understood that features described in relation to one embodiment may be featured in combinations with other embodiments.

With respect to the specification therefore, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The invention claimed is:

1. A hands-free camera mount comprising: a camera mount comprising: a base mounting means configured to securely connect to a base; a camera connector configured for mounting a camera securely thereon; an extension element configured to extend between the base mounting means and the camera connector so that in use a camera is mounted on the camera connector at a distal end of the extension element so that the camera is held a distance away from the base mounting means that is attached to a user or a surface; and a quick release mechanism configured to detach the extension element from the base mounting means when activated; wherein the base mounting means includes a ball mounting mechanism to allow the extension element to be adjusted to a user selectable angle; and wherein a sacrificial point is provided at the base mounting means to permit detachment of the camera connector and extension element if subjected to impact from a predetermined force.

2. A hands-free camera mount according to claim 1 wherein the extension element is sized so that the camera connector can be held a distance of substantially up to 150 cm away from the base mounting means.

3. A hands-free camera mount according to claim 1 wherein the extension element comprises a main section and an angled section, the main and angled sections arranged with their long axes at an angle to one another, the angled section sized so that the camera connector is held away from the long axis of the main section.

4. A hands-free camera mount as claimed according to claim 1 wherein the extension element includes a telescoping pole.

5. A hands-free camera mount according to claim 4 wherein the telescoping pole is extendible substantially up to 150 cm.

6. A hands-free camera mount according to claim 4 wherein the telescoping pole comprises a plurality of segments and a locking means is associated with each pair of adjacent segments, the locking means is configurable to lock adjacent segments into relative axial positions one with respect to another.

7. A hands-free camera mount according to claim 6 wherein the locking means includes a twist lock mechanism.

8. A hands-free camera mount according to claim 4 wherein the telescoping pole comprises a plurality of segments and a locking means is associated with each pair of adjacent segments and configurable to lock adjacent segments in their relative positions by lateral movement.

9. A hands-free camera mount according to claim 1 wherein the camera connector comprises a damping counterweight and an articulated mounting or joint.

10. A hands-free camera mount according to claim 9 wherein the articulated mounting or joint allows articulation in more than one axis.

11. A hands-free camera mount according to claim 9 wherein the damping counterweight is configured to extend below a camera mounted on the camera connector.

12. A hands-free camera mount according to claim 9 wherein the damping counterweight comprises an elongate extension and a weight, the elongate extension connecting between the camera connector and the weight so the weight is held at a distance from the camera connector.

13. A hands-free camera mount according to claim 1 wherein the base mounting means comprises a base plate.

14. A hands-free camera mount according to claim 13 wherein the base plate comprises one of the ball or socket portion of a ball and socket joint, the adjacent end of the extension element comprising the other portion of the ball and socket joint, the ball and socket lockably rotatable.

15. A hands-free camera mount according to claim 1 wherein the quick release mechanism comprises a lever.

16. A hands-free camera mount according to claim 1 including a series of settable joints is provided between the camera and user wherein a sacrificial joint comprises a sacrificial element.

17. A hands-free camera mount according to claim 16 wherein the sacrificial joint is a ball joint.

18. A hands-free camera mount comprising: a camera mount comprising: a base mounting means configured to securely connect to a base, the base mounting means including a ball mount with a breakaway failsafe comprising a sprung wire connection; a camera connector configured for mounting a camera securely thereon; an extension element configured to extend between the base mounting means and the camera connector so that in use a camera is mounted on the camera connector at a distal end of the extension element so that the camera is held a distance away from the base mounting means that is attached to a user or a surface; wherein the base mounting means includes a ball mounting mechanism to allow the extension element to be adjusted to a user selectable angle; and wherein a sacrificial point is provided at the base mounting means to permit detachment of the camera connector and extension element if subjected to impact from a predetermined force.

19. A hands-free camera mount comprising: a camera mount comprising: a base mounting means configured to securely connect to a base; a camera connector configured for mounting a camera securely thereon; an extension element including a telescoping pole configured to extend between the base mounting means and the camera connector so that in use a camera is mounted on the camera connector at a distal end of the extension element so that the camera is held a distance away from the base mounting means that is attached to a user or a surface; wherein the base mounting means includes a ball mounting mechanism to allow the extension element to be adjusted to a user selectable angle; wherein a sacrificial point is provided at the base mounting means to permit detachment of the camera connector and extension element if subjected to impact from a predetermined force; and wherein the telescoping pole comprises a plurality of segments and at least one clamp lock including a twist lock mechanism is associated with each pair of adjacent segments, the locking means is configurable to lock adjacent segments into relative axial positions one with respect to another.

20. A hands-free camera mount comprising: a camera mount comprising: a base mounting means configured to securely connect to a base, the base mounting means being configured for rigid connection to a base that forms part of a body harness; a camera connector configured for mounting a camera securely thereon; an extension element configured to extend between the base mounting means and the camera connector so that in use a camera is mounted on the camera connector at a distal end of the extension element so that the camera is held a distance away from the base mounting means that is attached to a user or a surface; wherein the base mounting means includes a ball mounting mechanism to allow the extension element to be adjusted to a user selectable angle; and wherein a sacrificial point is provided at the base mounting means to permit detachment of the camera connector and extension element if subjected to impact from a predetermined force.

21. A hands-free camera mount comprising: a camera mount comprising: a base mounting means configured to securely connect to a base; a camera connector configured for mounting a camera securely thereon; an extension element configured to extend between the base mounting means and the camera connector so that in use a camera is mounted on the camera connector at a distal end of the extension element so that the camera is held a distance away from the base mounting means that is attached to a user or a surface; wherein the base mounting means includes a ball mounting mechanism to allow the extension element to be adjusted to a user selectable angle; wherein a sacrificial point is provided at the base mounting means to permit detachment of the camera connector and extension element if subjected to impact from a predetermined force; and wherein a series of settable joints is provided between the camera and user in use in order that a camera self-levelling mechanism is enabled to operate with a settable range.

* * * * *